Sept. 9, 1924.
R. H. BOWEN
SHAFT HANGER
Filed Nov. 17, 1922   3 Sheets-Sheet 1
1,508,009
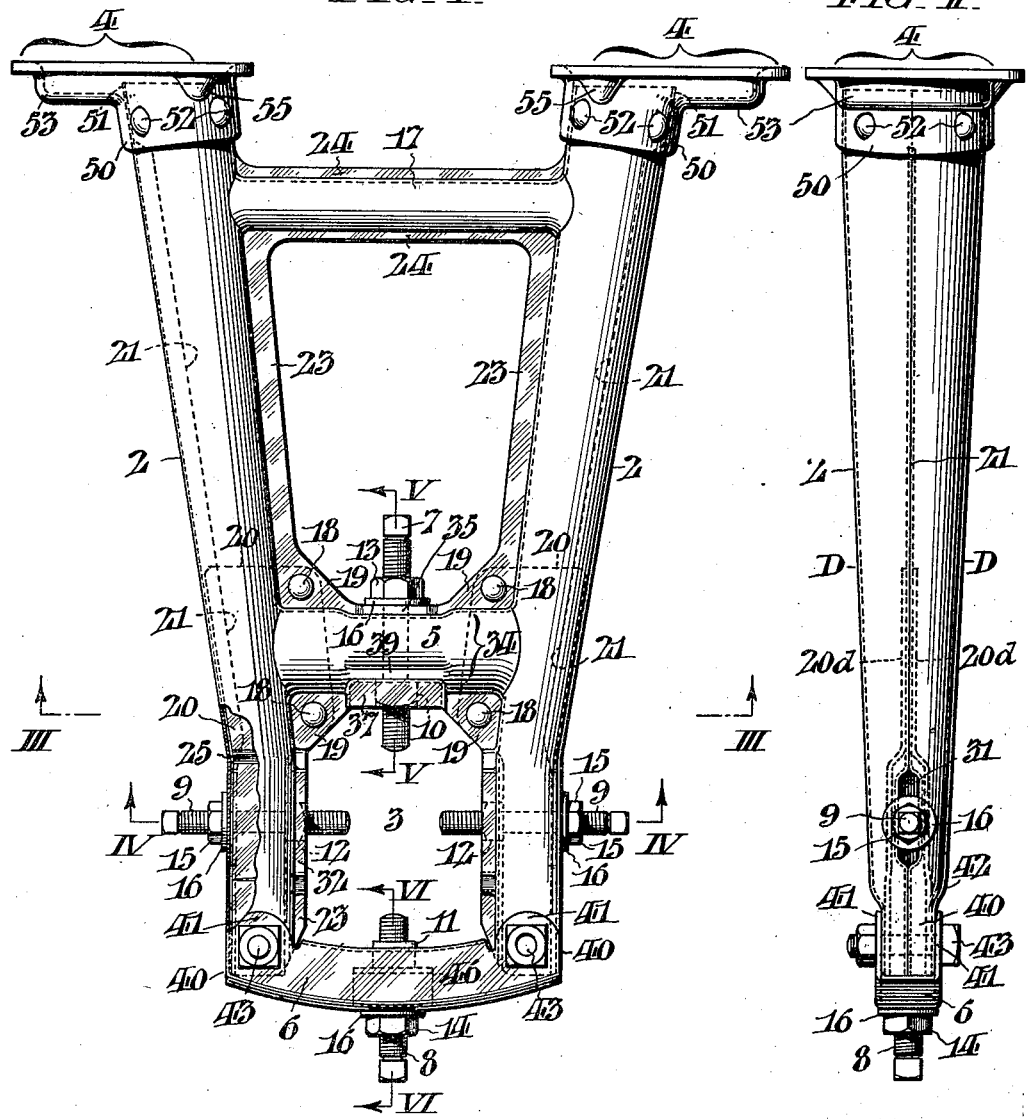
WITNESSES:
INVENTOR:
Russell H. Bowen,
ATTORNEYS.

Sept. 9, 1924.  R. H. BOWEN  1,508,009
SHAFT HANGER
Filed Nov. 17, 1922   3 Sheets-Sheet 2
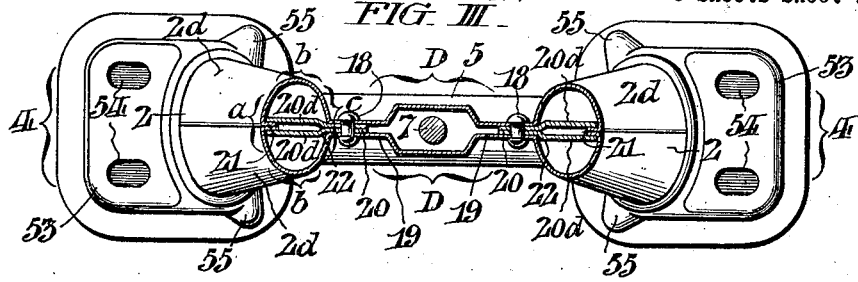
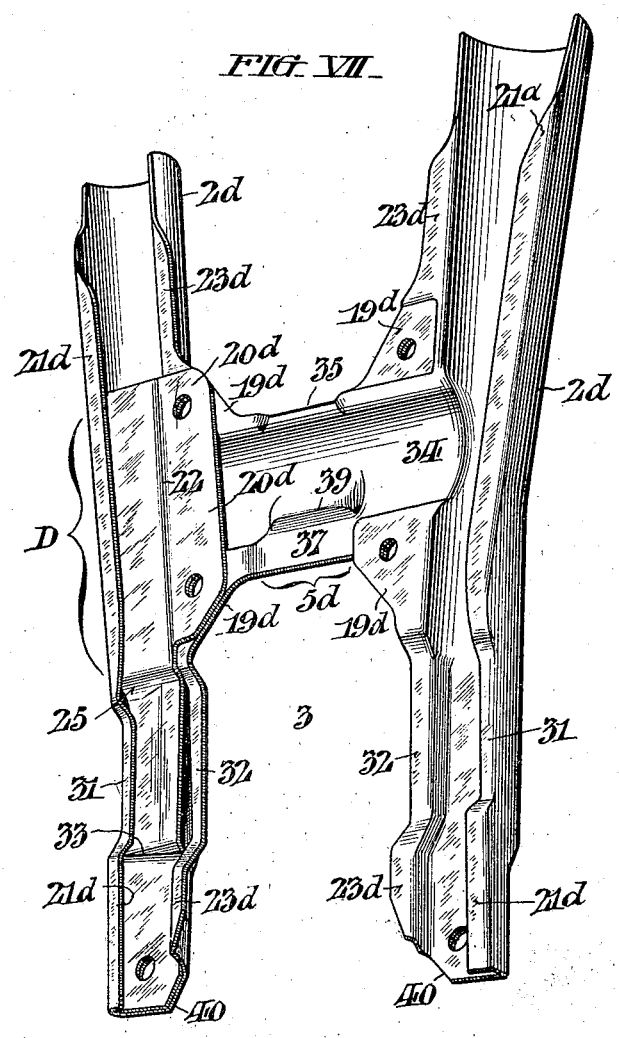
WITNESSES:
INVENTOR:
Russell H. Bowen,
BY Fraley & Paul
ATTORNEYS.

Sept. 9, 1924.  R. H. BOWEN  1,508,009
SHAFT HANGER
Filed Nov. 17, 1922  3 Sheets-Sheet 3
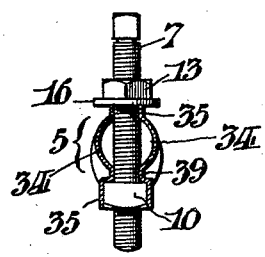
FIG. V.
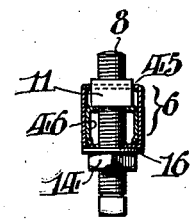
FIG. VI.
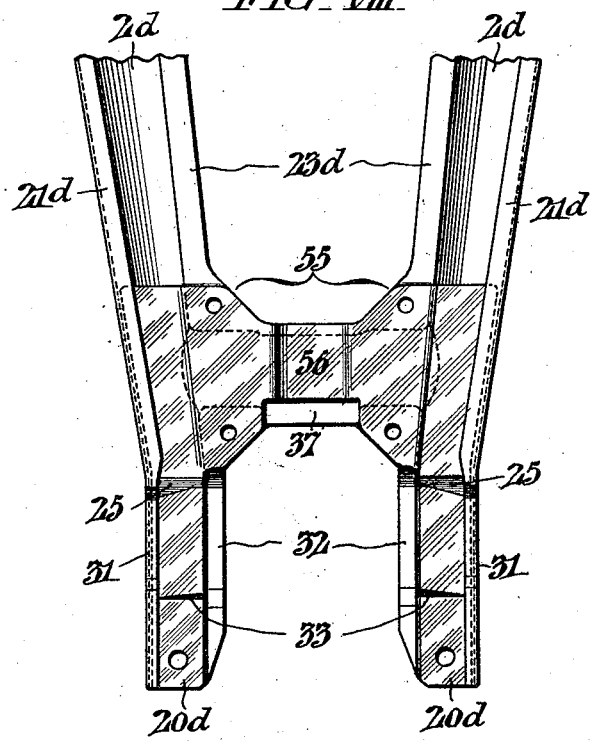
FIG. VIII.
INVENTOR:
Russell H. Bowen Patented Sept. 9, 1924.

1,508,009

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

SHAFT HANGER.

Application filed November 17, 1922. Serial No. 601,446.

*To all whom it may concern:*

Be it known that I, RUSSELL H. BOWEN, a citizen of the United States, residing at Philadelphia, county of Philadelphia, and State of Pennsylvania, have invented certain new and useful Improvements in Shaft Hangers, whereof the following is a specification, reference being had to the accompanying drawings.

My invention relates to shaft hangers and the like, and is especially concerned with shaft hangers of sheet metal type. Though my invention is to some extent applicable to other hangers, my principal aim, nevertheless, is to secure advantages that are greatly enhanced by sheet metal construction,— such as combined strength, rigidity and lightness; facility, simplicity, quickness, and economy in manufacture; and a generally neat and pleasing appearance. Other advantages that can be secured through the invention include excellent adaptation in strength of the various parts of the hanger to the stresses to which they are subjected in service; structural stiffness, and exemption from working or loosening in service; and an almost entire absence of crevices or openings liable to catch and accumulate lint, dirt, oil or grease that would add to the fire hazard in case of a "hot box" at a shaft bearing.

How these and other advantages can be realized through my invention will appear from my description hereinafter of the best embodiment known to me. While the structures hereinafter specifically illustrated and described are in some respects similar to those shown in my application Serial No. 497,781, filed September 1, 1921, they are even simpler and stronger in construction, and can be manufactured somewhat more easily and cheaply.

In the drawings, Fig. I is a side view of a hanger constructed in accordance with my present invention, with an external portion partly broken away to expose internal features.

Fig. II is an edge view of the same hanger.

Figs. III and IV are in the main transverse sectional views taken as indicated by the correspondingly numbered section lines in Fig. I, illustrating the configuration and construction of the hanger legs and of the cross-brace.

Figs. V and VI are fragmentary cross sectional views taken as indicated by the correspondingly numbered section lines in Fig. I.

Fig. VII is a perspective view of certain parts of a hanger construction quite similar to that of Figs. I and VI, but differing slightly in detail.

Fig. VIII is a fragmentary side view of parts corresponding to those shown in Fig. VII, illustrating a modified construction.

The shaft hanger here illustrated is of what may be termed the "straddling" type, comprising a pair of principal strength members 2, 2 with an opening 3 between them for the shaft and its bearing (not shown) that are to be supported. (See Fig. I.) The hanger is shown in the upright position in which such shaft hangers are commonly used; and for convenience and brevity, I have hereinafter (as a rule) described it in terms especially applicable to that position. It will be understood, however, that the hanger may be used in other positions,—in reference to which, of course, some of the terms here employed might seem less appropriate.

As shown, the strength members 2, 2 on either side of the shaft (when in place) are hollow, and are in the form of downward tapering legs or standards with feet 4 at their upper ends for attaching the hanger to a floor or roof beam (not shown), or to any other supporting structure. Between and interconnecting the side legs 2, 2 is a cross-brace member 5 having the general form of a transverse vertical web, and also a bottom member or yoke 6, which is readily detachable from the lower ends of the legs to facilitate introduction of the shaft into the shaft opening 3. For supporting the shaft and its bearing in the opening 3 and maintaining proper alignment, the hanger is provided with upper and lower supports 7, 8 extending vertically through the transverse members 5 and 6, as well as with lateral supports 9, 9 extending transversely through the legs 2, 2 at either side of the opening 3. These bearing-supports 7, 8 and 9, 9 have the usual form of set-screws, and are provided with adjusting nuts 10, 11 and 12, 12 mounted on or in the various members 5, 6 and 2, 2 as hereinafter described,—as well as with lock or clamping nuts 13, 14 and 15, 15 bearing against the outer sides of said members through interposed washers 16. As shown, the side legs 2, 2 are only approximately vertical, sloping outward and diverging somewhat from the shaft opening 3 toward their upper ends, so as to give the hanger an amply broad "transverse base" at the feet 4. In the particular construction illustrated in Fig. I, the legs 2, 2 are additionally interconnected, just below the feet 4, by a supplemental hollow cross-brace 17.

For convenience and brevity, the hollow legs 2, 2 may be regarded as "facing" toward the shaft (not shown) supported by the hanger, and various portions of their contours or walls (see Fig. III) may be correspondingly distinguished as "backs" $a$, "sides" or "flanks" $b$ and "bellies" $c$. (The use of the word "sides" in this "leg anatomy" to designate the leg surfaces to right and left in Figs. I and III must not be confused, of course, with the use of similar terms, e. g. "side legs" and "sidewise", to express the relation of parts at right and left of Figs. I, III and IV in reference to the hanger as a whole and to the position of the shaft and bearing supported by it.) Preferably (though not necessarily), the legs 2, 2 are closed—or virtually so—at least from the hanger feet 4 to the lateral bearing supports 9, 9, and even on beyond said supports to the bottom member 6. As shown, they are of round tubular form substantially from end to end. They are not truly circular, however, but more nearly elliptical, with the major axes of the ellipses extending from right to left in Fig. II, so as to give the legs and hanger ample strength in that direction. Preferably, the principal structural members of the hanger as thus far described (the legs 2, 2 and their interconnecting cross-braces 5, 17) are at once unified and divided, so to speak, by constructing the main portion or "body" of the hanger in unitary halves D, D suitably superposed and secured together. These halves D, D can be easily and economically formed out of metal sheets appropriately cut and embossed, as by a die pressing or stamping operation. They may be secured together by rivets 18 extending through juxtaposed flanges or webs such as those forming the flat portions 19 of the transverse member 5, and also (or alternatively) by spot-welding at these or other such portions,—as hereinafter further described.

Referring, now, to Figs. I, III, IV and VII, it will be seen that within each leg 2 there is a web-like strength member 20, which is attached to the transverse laterally extending member 5 that sustains the bearing support 7 and extends downwardly beside the shaft opening 3 substantially to (i. e., as far as) and even past the lateral bearing support 9, to the lower end of the leg, where the bottom member 6 is attached. As shown, these members 20, 20 are separate parts facially overlapping and secured to the transverse member 5,—being, in fact, interposed between the halves or plies of the flat web portions 19 of this member 5, and secured by the rivets 18 that secure the latter together. Besides serving to reinforce and stiffen the legs 2, 2 sidewise of the hanger, in the common plane of the legs, and to reinforce and stiffen the hanger as a whole sidewise, these internal longitudinal web-like members 20, 20 afford backing to sustain the lateral bearing supports 9, 9 and resist their side thrust on the legs, and also serve to sustain the bottom member 6. In the particular construction here illustrated, they perform these latter functions in a very direct manner, as will presently appear.

As here shown, the web members 20 extend across through the legs 2 and resist all inward forces tending to bend or flatten the legs, as well as all forces (inward or outward) tending to "rock" them (so to speak) about the ends of the cross-brace 5 or about the feet 4. In this latter regard, they are in effect structural extensions of the members 5 itself, which, as here shown, terminates substantially at the leg bellies. In order that each web 20 may most effectually co-act with the corresponding leg back $a$ to brace the leg 2 against any and all rocking or displacement relatively to the transverse member 5, each web 20 is connected or attached to the leg back $a$ directly opposite the transverse member 5 and the triangular corners 19 at its junction with the leg belly $c$. Conversely, the connection or attachment at the leg back $a$ fortifies the cantilever and tensional action of the bracing webs 20 in sustaining the bearing supports 9 and the bottom member 6. As shown in Figs. I, III, IV and VII the attachment of the webs 20 to the leg backs $a$ is effected in the following manner: that is to say, the legs have internal longitudinal flanges 21 (of relatively narrow width as compared with the legs themselves) projecting inward into their interiors from their back walls $a$ and attached to the latter throughout their length, and the webs 20 facially overlap the flanges 21 and are spot-welded or otherwise secured to them. These internal flanges 21 also serve as a general reinforcement for stiffening the legs 2 transversely of the hanger, and they are enclosed by the external leg wall behind their junction therewith, as well as at either side. Throughout the length of the webs 20, there may be a slight clearance between their outer edges and the leg backs $a$, as shown in Figs. I, IV and VIII. As here shown, the webs 20 are laminated or multi-plied, being composed of a couple of superposed metal sheets or plates $20^d$, $20^d$, preferably spot welded or otherwise secured together over their area of facial contact. Within each leg 2, these plies $20^d$, $20^d$, are laterally offset or joggled as at 22 (Figs. III and VII), so as to overlap and be secured at opposite sides of the back flange 21.

With the construction of the hanger in sheet metal halves D, D as already described, the internal longitudinal leg back flanges 21 may be formed by bending or flanging inward the outer edges of the concave embossed leg portions $2^d$, i. e., the edges of these leg portions opposite those whence extend the transverse portions $5^d$. In the latter case, these oppositely inturned flanges $21^d$, $21^d$ may be secured together (as by spot-welding) as a means of uniting the leg halves $2^d$ along their backs $a$. The ample thickness and strength easily given the internal leg flanges 21 by multiply construction will readily be appreciated, as well as the advantages of forming them out of the sheet metal of the leg itself. As shown, the inner edges of the leg portions $2^d$ are similarly bent or flanged outward to form external longitudinal flanges $23^d$, $23^d$, which overlap and may be spot-welded or otherwise secured together as a means of uniting the hanger halves D, D, along the leg bellies $c$. Except at the transverse members 5 and 17 and where separated to afford openings for the lateral bearing supports 9, the internal back flanges $21^d$, $21^d$ and the external belly flanges $23^d$, $23^d$ extend and may be united practically throughout the entire length of each leg 2. As shown, the transverse member portions $17^d$ have similar external flanges $24^d$ along both edges, which may be similarly secured together. The integral internal and external flanges 21 and 23 reinforce and stiffen the legs 2, 2 sidewise of the hanger, and the external flanges 24 serve a similar purpose in reference to the transverse member 17.

Referring, now, more especially to Figs. III, IV and VII, it will be observed that the webs 20, 20 are in the present instance arranged centrally with reference to the legs 2, 2 substantially in their common axial median plane. In the portion of each leg 2 where its bearing support 9 is located, the sheet metal of its web 20 is displaced or offset laterally at 25, by joggling, to accommodate the screw member 9 between its plies. In this way, the plies $20^d$, $20^d$ are separated for a sufficient vertical distance to allow the screw 9 to occupy any vertical position ever required for proper vertical adjustment of bearing and shaft in the hanger opening 3,—there being, of course, a suitable slot 31 in the leg back $a$, where the internal flanges $21^d$, $21^d$ are narrowed somewhat and appropriately separated or everted, and may still be facially welded to the web plies $20^d$, $20^d$. In the leg belly $c$, there is a wider and correspondingly elongated opening 32 adapted to admit the support adjusting nut 12 to seat against the inner or "belly" edges of the web 20,—this opening 32 being formed by everting the belly walls $c$ (and especially their flange portions $23^d$, $23^d$) to either side sufficiently to admit the nut 12 between the everted portions. With this mounting, the nut 12 is not only concealed and held against turning by the sides of the opening 32, but is allowed to transmit the side thrust of the screw 9 directly to the web 20 itself. This thrust the web 20 in turn transmits to the leg back flange 21, and thus distributes to and shares with the leg walls. Beyond the support 9, the web plies $20^d$, $20^d$ are still further separated, as by joggling at 33, to bring them against the leg walls or flanks $b$, $b$ where the bottom member 6 is attached to the leg.

Referring to Figs. III, IV, V, and VII, it will be seen that the transverse member 5 is itself reinforced and stiffened by opposite outward embossments of its sheet metal plies or halves $5^d$, $5^d$, in the form of rounded or circular transverse corrugations 34, which merge into the curved walls of the legs 2, 2. Above and below these corrugations 34, the plies $5^d$, $5^d$ may be spot-welded or otherwise secured together or to the faces of the webs 20, as at 19. In the middle of the cross brace member 5, the upper edges of the plies $5^d$, $5^d$ are locally separated at 35, in the way of outward embossing or joggling, to afford a somewhat elongated opening or slot for the accommodation of the upper bearing support 7 between the plies; and their lower edges are still further separated at 37 to provide a concealed anti-turning seat for the adjusting nut 10. Just above this seat 37, the walls of the transverse corrugations 34 are sharply pressed inward, as shown at 39, in order to form shoulders at the bottom of the seat 37 for receiving and sustaining the nut 10.

Referring, now, to Figs. I, II, and VI, it will be observed that the sheet metal bottom or yoke member 6 is of approximately rectangular cross-section, and is slightly bent or "bowed" downward. At either end, the upper wall is omitted to afford an opening for the leg end 40, and the side walls are extended upward in the form of rounded and apertured ears or lugs 41, 41. The leg ends 40, 40 are laterally flattened somewhat, as indicated at 42, and are apertured in correspondence with the ears 41 for the reception of bolts 43 that detachably secure the yoke 6 on the leg ends. These bolts 43 extend through the bracing webs 20, 20 which thus reinforce and coact with the metal of the leg walls in taking these bolts and sustaining the bottom member 6. The lower vertical bearing-support 8 extends through an elongated opening or slot in the lower wall of the yoke 6, and its adjusting nut 11 is seated and held against turning in a corresponding elongated opening 45 in the top wall, against the upper surface of an inverted sheet metal trough piece 46 secured inside the yoke, and apertured to take the member 8.

Recurring, now, to the feet 4, it will be seen from Figs. I, II and III that they are of generally flat, rectangular form, but have outstanding tubular sockets 50 in which the legs 2 are received and expanded, as at 51, and also secured by some four rivets 52. The feet 4 are reinforced and stiffened with low, flat, hollow central bosses 53 that extend outward from the sockets 50 toward the outer ends of the feet and have in them elongated holes 54; also by short, hollow tapering ridges 55 that radiate diagonally (inward and sidewise) from the sockets 50 toward the inner corners of the feet. The feet 4 may be die-pressed from heavy sheet metal, or may be drop-forged from suitable metal blanks.

From the foregoing description, it will be seen that even aside from the hollow legs 2, 2 that enclose the web members 20, 20, these members and the transverse member 5 form a structurally complete and rigid U-shaped frame for sustaining the bearing supports 7 and 9, 9. This frame is supplemented and closed by the bottom member 6, which is securely attached to the lateral members 20, 20 of the frame by the bolts 43, in a manner independently of the legs 2, 2. In the construction here illustrated, of course, the legs 2, 2 completely overlap the lateral frame members 20, 20. They are secured to the upper corners of the frame by their integral attachment to the cross-brace 5, as well as by the rivets 18, and to the lower corners of the frame by the bolts 43.

With such a construction as I have described, it will be seen, the legs 2, 2 and the parts integral with them can be made of relatively thin sheet metal, so as to be as light as consists with their function of rigidly supporting the bearing and shaft as a whole, while the lateral members 20, 20 and the bottom member 6 can (if necessary) be made of considerably heavier sheet metal, as indicated in Figs. III, IV, and VII, to afford ample strength for sustaining the supports 8 and 9, 9. No difficulty in this regard arises from making the cross-brace 5 integral with the legs 2, 2 as here illustrated, since the shortness of this member and the vertical width that can be given it allows it to be made of ample rigidity even when of thin metal. The adaptation of the invention to hangers of single leg type will be self-evident.

The hanger construction illustrated in Fig. VII differs from that of Figs. I to VI in lacking the cross-brace 17. In other respects, it affords an accurate representation of one of the hanger halves D illustrated in Figs. I to VI after the metal sheet from which it is formed is cut and embossed to shape,—with one of the web laminæ $20^d$ in place. Its various parts and features corresponding to those of Figs. I to VI are marked with similar reference characters, as a means of dispensing with merely repetitive description.

The modified construction illustrated in Fig. VIII differs from that of Fig. VII in that the strength member laminæ $20^d$, $20^d$ in the leg portions $2^d$, $2^d$ shown are integral with one another. In the complete hanger, therefore, the four parts that go to make the strength members 20, 20 illustrated in Figs. I to VII are replaced by two U-shaped sheet metal parts 55 such as shown in Fig. VII. The U-frame for sustaining the bearing supports 7 and 9, 9 is thus made structurally complete and rigid quite independently of the hanger cross-brace 5. As shown, the transverse connecting portion of each U-plate 55 is suitably joggled or embossed at 56 to accommodate the bearing support 7 between the plates. Various parts and features corresponding to those of Figs. I to VII are marked with similar reference characters, as a means of dispensing with merely repetitive description.

I do not herein claim broadly various novel parts, features, and combinations herein disclosed, since the same form the broad subject-matter of my application Serial No. 497,781, above mentioned.

Having thus described my invention, I claim:

1. A sheet metal hanger comprising a hollow leg reinforced and stiffened, sidewise of the hanger, with an integral internal longitudinal flange projecting inward into the interior of the leg from the external leg wall; said flange being narrower than the leg and enclosed therein by said external wall behind the junction of flange and wall, as well as at either side.

2. A sheet metal hanger comprising a hollow leg reinforced and stiffened, sidewise of the hanger, with an internal longitudinal flange extending from above the cross-brace of the hanger down beside its shaft opening, and throughout its length attached to the external leg wall; said flange being narrower than the leg and enclosed therein by said external wall behind the junction of flange and wall, as well as at either side.

3. A sheet metal hanger comprising a hollow leg having its back reinforced and stiffened, sidewise of the hanger, with a multiply internal longitudinal flange, narrower than the leg, formed by portions of the sheet metal of its wall oppositely bent into its interior.

4. A sheet metal hanger comprising a leg with a member extending laterally therefrom for sustaining a bearing support, and a longitudinal web for reinforcing and stiffening the leg sidewise of the hanger facially overlapping and secured to said member, and extending downward therefrom beside the shaft opening of the hanger.

5. A sheet metal hanger comprising a leg with a member extending laterally therefrom for sustaining a bearing support, and a longitudinal web for reinforcing and stiffening the leg sidewise of the hanger facially overlapping and secured to said member, and extending downward therefrom as far as the lateral bearing-support of the leg, to resist its side thrust.

6. A sheet metal hanger comprising side legs with an interconnecting crossbrace, and a web for reinforcing and stiffening each leg sidewise of the hanger facially overlapping and secured to said crossbrace, and extending downward therefrom to coact with the leg in taking the securing means for the bottom yoke of the hanger.

7. A sheet metal hanger comprising a hollow leg with a transverse member extending laterally therefrom for sustaining a bearing support, and a separate strength member secured to said transverse member and extending down in the leg below said transverse member sufficiently to reinforce and stiffen the leg below said member.

8. A sheet metal hanger comprising a hollow leg of relatively thin sheet metal, with a transverse member extending laterally therefrom for sustaining a bearing support, and a thicker sheet metal web secured to said transverse member and extending down in the leg below said transverse member sufficiently to reinforce and stiffen the leg below said member, as well as to brace it relatively thereto.

9. A sheet metal hanger comprising a hollow leg with a member extending laterally therefrom for sustaining a bearing support, and a strength member facially overlapping and secured to said transverse member extending down within the leg as far as its lateral bearing support, to resist the side thrust thereof.

10. A sheet metal hanger comprising a hollow leg with a member extending laterally therefrom for sustaining a bearing support, and a separate strength member for reinforcing and stiffening the leg sidewise of the hanger secured to said transverse member, and extending down within the leg to sustain the bottom member of the hanger.

11. A sheet metal hanger comprising a hollow leg with a member extending laterally therefrom for sustaining a bearing support, and a strength member facially overlapping and secured to said transverse member extending down within the leg to sustain its lateral bearing support and the bottom member of the hanger.

12. A metal hanger comprising a hollow leg of relatively thin sheet metal, with a transverse member extending laterally therefrom for sustaining a bearing support, and a thicker sheet metal web secured to said transverse member and extending down within the leg to sustain its lateral bearing support and the bottom member of the hanger.

13. A sheet metal hanger comprising a hollow leg with a transverse member extending laterally therefrom for sustaining a bearing support, and a multiply web attached to said transverse member and extending down within the leg past its lateral bearing support to coact with the leg walls in taking the securing means for the bottom member of the hanger, the plies of said web being separated to accommodate said lateral bearing support between them while affording backing to sustain it, and further separated beyond said support to bring them against the leg walls.

14. A sheet metal hanger comprising a hollow leg with a transverse member terminating substantially at its belly and extending laterally from the leg for sustaining a bearing support, and a web attached to the leg back extending across through the leg and facially overlapping and secured to said transverse member, to brace the leg relatively thereto.

15. A sheet metal hanger comprising a hollow leg with a hollow transverse member terminating substantially at its belly extending laterally from the leg for sustaining a bearing support, and a separate web internally and facially overlapping and rigidly secured to said transverse member, said web extending across through said leg and cooperating with its back to brace said transverse member relatively to the leg.

16. A sheet metal hanger comprising a hollow leg with a transverse member extending laterally therefrom for sustaining a bearing support, and formed integral with the leg walls; and a web facially overlapping and secured to said transverse member and attached to the back of said leg directly opposite said transverse member.

17. A sheet metal hanger comprising a hollow leg with an internal longitudinal flange at one side and a transverse member extending from its other side for sustaining a lateral bearing support, and a web facially overlapping and secured to said transverse member extending across through said leg and secured to said internal flange.

18. A sheet metal hanger comprising a hollow leg, with back, sides and belly, and an internal longitudinal flange on the back, together with a transverse bearing sustaining structure attached to and extending laterally from the leg belly, and facially overlapping and secured to said internal flange.

19. A sheet metal hanger comprising a hollow leg with a transverse member extending laterally therefrom for sustaining a bearing support, and a web facially overlapping and secured to said transverse member extending down in the leg below said transverse member sufficiently to reinforce and stiffen the leg below said member, and attached to the back of the leg above the shaft opening of the hanger.

20. A sheet metal hanger comprising a hollow leg with a transverse member extending laterally therefrom for sustaining a bearing support, and a web facially overlapping and secured to said transverse member extending downward therefrom within the leg to sustain its lateral bearing support, and attached to the back of the leg directly opposite said transverse member.

21. A hanger comprising sheet metal halves, each with a concave leg portion and a portion for sustaining a bearing support extending from its edge, superposed and secured together to form a hollow leg with a bearing support sustaining member extending laterally therefrom; and a separate strength member for reinforcing and stiffening said leg sidewise of the hanger interposed and secured between the hanger halves, and extending downward within the leg.

22. A hanger comprising sheet metal halves, each with a concave leg portion and a portion for sustaining a bearing support extending from its edge, superposed and secured together to form a hollow leg with a bearing support sustaining member extending laterally therefrom; and a web interposed and secured between the halves of said support sustaining member extending across the interior of the leg, and cooperating with the leg back to brace said member relatively to the leg.

23. A hanger comprising sheet metal halves, with interconnecting crossbrace and concave leg portions, superposed and secured together to form hollow legs with an interconnecting cross brace; and a sheet metal web for reinforcing and stiffening the hanger sidewise interposed and secured between its halves and extending downward within each leg.

24. A hanger comprising a pair of metal sheets cut and embossed to form concave leg halves with interconnecting cross brace halves, superposed and secured together to form hollow legs with an interconnecting crossbrace; and a strength member for reinforcing and stiffening the hanger sidewise interposed and secured between the crossbrace halves, and extending downward within each leg to sustain its lateral bearing support.

25. A hanger comprising sheet metal halves, with interconnecting cross brace and concave leg portions, superposed and secured together to form hollow legs with an interconnecting cross brace; and a strength member interposed and secured between the hanger halves and extending downward within each leg to sustain its lateral bearing support and the bottom yoke of the hanger.

26. A hanger including sheet metal halves each comprising a concave leg portion with one edge flanged inward and a portion for sustaining a bearing support extending from its other edge, said halves being superposed and secured together to form a hollow leg with a support sustaining member extending laterally therefrom; and a web interposed and secured between the halves of said support sustaining member, and also secured to the aforesaid inturned flanges at the other side of the leg.

27. A hanger including sheet metal halves each comprising a concave leg portion with one edge flanged inward and a portion for sustaining a bearing support extending from its other edge, said halves being superposed and secured together by their inturned flanges aforesaid to form a hollow leg with a support sustaining member extending laterally therefrom; and a web comprising plies interposed and secured between the halves of said support sustaining member, and overlapping and secured to opposite sides of the aforesaid inturned flanges at the other side of the leg.

28. A hanger comprising a structurally complete rigid U frame for sustaining bearing supports, with hollow legs for supporting said frame enclosing its upper corners and separately attached to the sides of the transverse member of the U.

29. A hanger comprising a structurally complete rigid U frame for sustaining bearing supports, with hollow legs for supporting said frame separately attached to the transverse and lateral members of the U, and enclosing the latter.

30. A hanger comprising a structurally complete rigid frame, for sustaining bearing supports, composed of separate lateral and transverse members secured together, with hollow legs for supporting said frame enclosing said lateral members.

31. A hanger comprising a structurally complete rigid frame, for sustaining bearing supports, composed of separate lateral and transverse members secured together, with hollow legs for supporting said frame enclosing said lateral members and attached to said transverse member.

32. A sheet metal hanger comprising hollow legs, with backs, sides, and bellies, and internal longitudinal flanges on their backs, together with a structurally complete rigid frame for sustaining bearing supports attached to the leg bellies and facially overlapping and secured to said internal flanges.

33. A hanger comprising a structurally complete rigid frame for sustaining bearing supports, and embossed sheet metal leg halves separate from the lateral members of said frame, but superposed and secured together at opposite faces of the latter to form hollow legs enclosing said lateral frame members.

In testimony whereof, I have hereunto signed my name at Philadelphia, Pennsylvania, this 14th day of November, 1922.

RUSSELL H. BOWEN.

Witnesses:
 JAMES H. BELL,
 E. L. FULLERTON.